A. Patterson,

Making Bells,

No. 2,793. Reissued Oct. 29, 1867.

Witnesses.
James Moulton
A. B. Stevens

Inventor.
Andw. Patterson

United States Patent Office.

ANDREW PATTERSON, OF BIRMINGHAM, PENNSYLVANIA.

*Letters Patent No.* 62,678, *dated March* 5, 1867; *reissue No.* 2,793, *dated October* 29, 1867.

IMPROVEMENT IN THE MANUFACTURE OF BELLS.

The Schedule referred to in these Letters Patent and making part of the same.

TO ALL WHOM IT MAY CONCERN:

Be it known that I, ANDREW PATTERSON, of Birmingham, in the county of Allegheny, and State of Pennsylvania, have invented a new and useful Improvement in the Manufacture of Bells; and I do hereby declare the following to be a full, clear, and exact description thereof.

The things chiefly requisite to a good bell are that it shall be so keyed as to produce a sonorous and musical sound, and that it shall be of such shape and of material possessing such a degree of homogeneity that its vibrations shall be in unison. The first requirement relates to the kind and volume of sound; the second, to its purity. The invention I am about to describe is designed more particularly to secure the latter of these requirements, by making bells, uniform in thickness and density in corresponding parts, from metal of uniform hardness and elasticity. To secure all these results by the ordinary process of casting has been found difficult, not to say impossible; and, even in the hands of the most skillful workmen, the casting of a bell is subject to so many contingencies that the purity of the sound of the bell thus produced, as well as its kind and volume, is generally a matter of chance, consequently the production of a set of chime-bells becomes by the ordinary process a work of no little labor and expense. To obviate these difficulties, and bring the conditions on which the tone of a bell depends within the control of the workman, I have invented an improvement, the nature of which consists in making seamless concave bells of single sheets of wrought or rolled steel, by shaping the metal, while sufficiently heated, between dies so formed as to give an increased thickness of metal at or towards the mouth of the bell.

To enable others skilled in the art to make and use my invention I will proceed to describe my mode of manufacture, referring for that purpose to the accompanying drawings, making a part of this specification, and to the letters of reference marked thereon—

Figure 1:
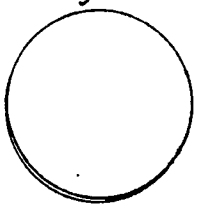

Figure 1 being a top view of a circular plate of wrought or rolled steel.

Figure 2:
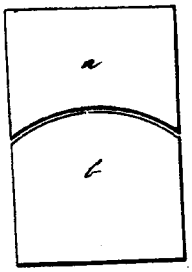
Figure 3:
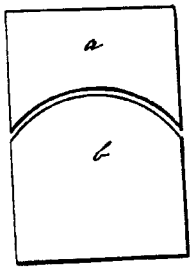
Figure 4:
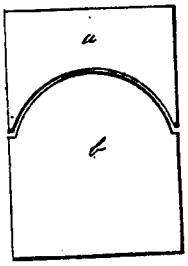
Figure 5:
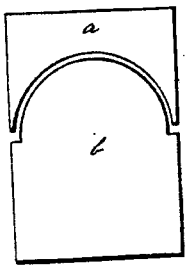
Figure 6:
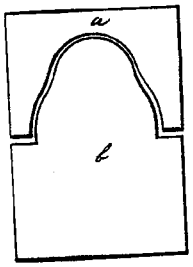
Figure 7:
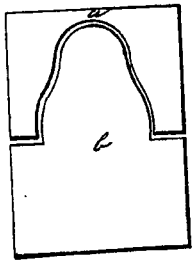
Figure 8:
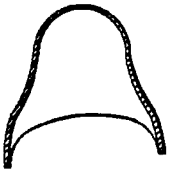

Figures 2 to 7, inclusive, being vertical sections of a series of dies, such as I use in forming bells of the ordinary shape; and Figure 8 being a vertical section of a bell formed from a sheet of steel by my improvement.

For material, as already stated, I use steel rolled or wrought by any of the ordinary processes, whereby a resultant will be secured of homogeneous character throughout. From this steel circular disks or plates (fig. 1) are cut, usually not to exceed about one-fourth of the diameter of the mouth of the desired bell. These disks being rendered somewhat pliable by heat, I subject them to the action of male and female dies, of about the shape shown at *a* and *b*, fig. 2, by which it is pressed into a dish shape. If it be necessary, in order to preserve the desired pliability in the steel, I reheat it and pass it between another pair of dies, *a b*, fig. 3, by which its shape is still further changed, so that by these, as also by the succeeding dies shown in figs. 4 to 6, it gradually approximates to, and in fig. 7 finally reaches, a concave or bell shape. The forms of the various dies, so far as relates to their similarity to or dissimilarity from a bell shape, may be somewhat varied, and even a greater or less number of dies may be used, so that the amount of the concavity secured by each set of dies may be greater or less at pleasure. In the manufacture of gong-bells a less number of sets of dies will be required than in the manufacture of bells of the shape shown in fig. 8; and in fact a single pair of dies will, for making gong-bells, generally be found sufficient. The dies may be operated in any ordinary way, provided sufficient power be applied. In the manner above described I gradually increase the concavity of one side of the bell-blank and the convexity of the other, till the flat disk shown in fig. 1 has assumed the bell shape shown in fig. 8, or such approximation thereto as may be desirable. In this mode of making bells the dies tend to produce two results which it is important to notice: they draw out the steel radially from the centre toward the circumference of the blank, thus reducing it in thickness at or toward the centre, and at the same time they shorten the diameter of the plane of the outer rim or edge of the mouth, and thus give increased thickness to the bell at or towards its outer rim or mouth, whereby the bell is greatly strengthened at the point where the greatest danger and liability to crack exist, and also its tone is greatly improved. But in order to secure the full benefit of this tendency of the operation of the dies, I find it better that the male die *b*, in each set of dies, should have a radius of curvature somewhat shorter than that of the corresponding female die *a*. In this way bells will be formed increasing in thickness from the centre towards the rim or mouth. But it is not necessary that the radius of curvature should be the same throughout the area or face of any one die. Bells generally flare more or less at different points from the centre outwards or downwards; and the difference between the lengths of the radii of curvature of male and female dies, at corresponding points in each, may be greater or less, according as it is desirable to give the bell at those points greater or less flare, and with it greater or less thickness. But it is not necessary that the dies be so shaped as to secure both the results referred to, *i. e.*, thinning the centre and thickening the rim at the same time, nor even in the same bell, since each such result may be secured independently of the other. Or, if so preferred, the blanks may be reduced to a bell shape between dies of equal radii at corresponding points; after which their thickness and flare may, if desirable, be increased or lessened, in the same way, at any desirable distances from the centre.

In this way, by a process easy of operation, uniform and certain in its results, involving no waste or loss, and but little expenditure, I manufacture bells of superior quality, of greater purity of tone, and of greater strength and durability, than can be obtained with the same weight of metal when the bells are formed by casting. In a plane passing through the bell at any point at right angles to its axis a uniform thickness is easily secured, (which in casting is always difficult,) and in all parts of the bell a degree of density, hardness, and elasticity nearly or quite uniform.

The specific note and the volume of sound produced by a bell manufactured in the way described are governed to some extent by the diameter and thickness of the circular blank from which it is made. Other things being equal, a thicker sheet will produce a more rigid bell, and consequently a higher or sharper note, and a sheet of longer diameter will produce a bell of a louder and lower note. By thus varying not only the shape of the dies, but also the size and thickness of the sheets or blanks, I am able to make bells possessing the advantages above set forth, with greater variety of tone, and at a greatly reduced first cost. To improve their appearance, and free them from liability to injury by rust, I sometimes plate them with some finer non-oxidizable metal, as is done with cast bells for similar purposes.

What I claim as my invention, and desire to secure by Letters Patent, is—

1. Making seamless concave bells of single sheets of wrought or rolled steel, by forming or shaping the metal between dies, while sufficiently heated, and so as to give an increasing thickness of metal at or toward the mouth of the bell, substantially as above described.

2. Wrought-steel seamless concave bells, constructed as hereinbefore described, as a new article of manufacture.

In testimony whereof I, the said ANDREW PATTERSON, have hereunto set my hand.

ANDREW PATTERSON.

Witnesses:

A. S. NICHOLSON,

GEO. H. CHRISTY.